United States Patent
Pahl

(10) Patent No.: US 11,623,727 B2
(45) Date of Patent: Apr. 11, 2023

(54) AIRCRAFT-FUSELAGE STRUCTURE WITH CONTOURED ADAPTER ARRANGEMENT FOR A DOOR

(71) Applicant: Airbus Operations GmbH, Hamburg (DE)

(72) Inventor: Günter Pahl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 340 days.

(21) Appl. No.: 16/750,644

(22) Filed: Jan. 23, 2020

(65) Prior Publication Data

US 2020/0283120 A1 Sep. 10, 2020

(30) Foreign Application Priority Data

Jan. 24, 2019 (DE) ...................... 10 2019 101 783.1

(51) Int. Cl.
*B64C 1/14* (2006.01)
*B64C 1/06* (2006.01)
*B64C 1/12* (2006.01)

(52) U.S. Cl.
CPC ............ *B64C 1/1461* (2013.01); *B64C 1/068* (2013.01); *B64C 1/12* (2013.01)

(58) Field of Classification Search
CPC ..... B64C 1/1461; B64C 1/143; B64C 1/1407; B64C 1/068; B64C 1/12
USPC ...................................................... 244/129.5
See application file for complete search history.

(56) References Cited

U.S. PATENT DOCUMENTS

| | | | | |
|---|---|---|---|---|
| 10,450,048 | B2* | 10/2019 | Elbracht | ................ B33Y 10/00 |
| 2007/0007390 | A1 | 1/2007 | Doerer | |
| 2017/0297676 | A1* | 10/2017 | Nordman | ................ B64C 1/068 |

FOREIGN PATENT DOCUMENTS

| | | |
|---|---|---|
| DE | 101 09 638 A1 | 9/2002 |
| DE | 10 2009 057 010 A1 | 6/2011 |
| DE | 10 2009 057 012 A1 | 6/2011 |
| DE | 10 2007 015 007 B4 | 1/2013 |
| DE | 10 2016 207 902 A1 | 11/2017 |
| EP | 2 374 713 A2 | 10/2011 |

(Continued)

OTHER PUBLICATIONS

German Search Report for Application No. 10 2019 101 783.1 dated May 29, 2019.

*Primary Examiner* — Brady W Frazier
(74) *Attorney, Agent, or Firm* — KDW Firm PLLC

(57) ABSTRACT

An aircraft-fuselage structure with an external skin and reinforcement structure, supporting the external skin and includes transverse reinforcement elements and longitudinal reinforcement elements. A door opening is in the external skin, between two transverse reinforcement elements and between two longitudinal reinforcement elements, and a door arrangement is installed therein, the door arrangement having a door frame fastened in the door opening and a door panel fastened on the door frame. The door frame and/or the door panel have/has an outer surface directed towards the surroundings and having a curvature differing from curvature of the external skin adjacent to the door opening, and an adapter arrangement is on the outer surface of the door frame and/or of the door panel and, on a side directed towards the surroundings, has at least one surface element which steadily continues the curvature of the external skin adjacent to the door opening.

12 Claims, 2 Drawing Sheets

(56) References Cited

FOREIGN PATENT DOCUMENTS

| EP | 2990329 A1 | * | 3/2016 | ............... | B64C 1/14 |
| EP | 3321174 A1 | * | 5/2018 | ........... | B64C 1/1461 |
| WO | WO-2017029180 A1 | * | 2/2017 | ............... | B64C 1/40 |
| WO | WO-2019229074 A1 | * | 12/2019 | ........... | B64C 1/1423 |

* cited by examiner

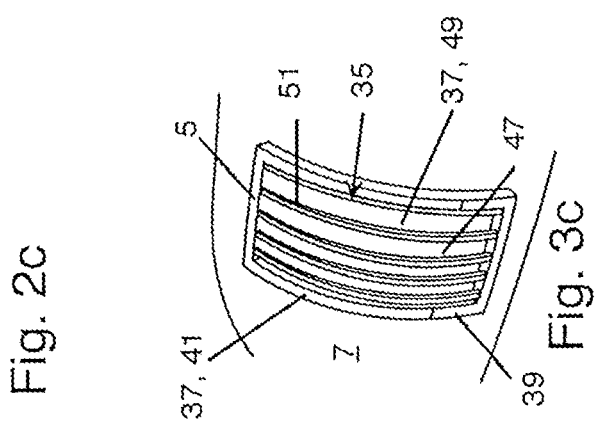
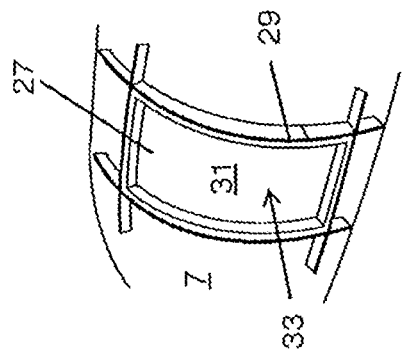
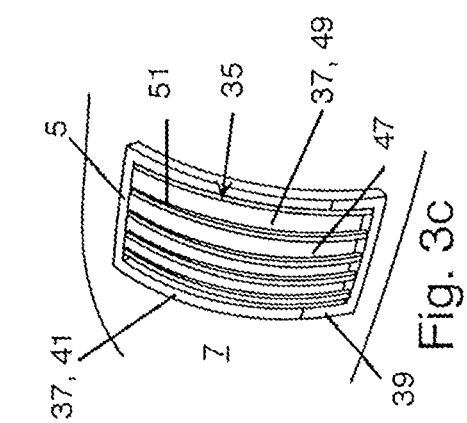
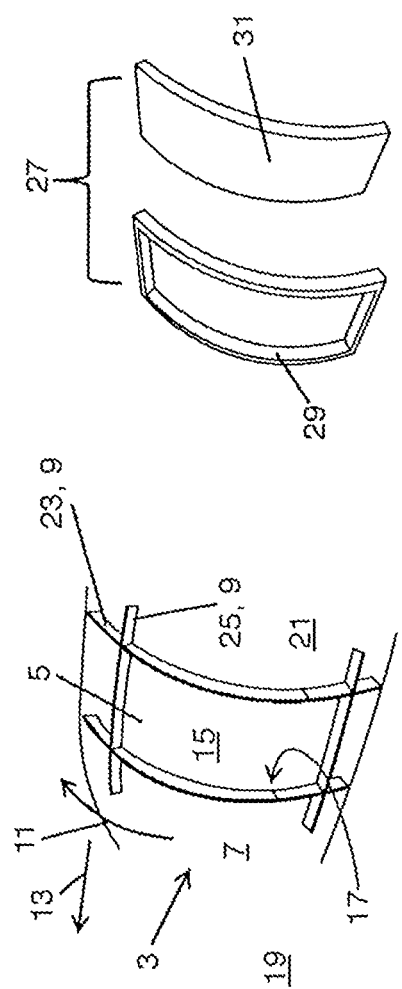
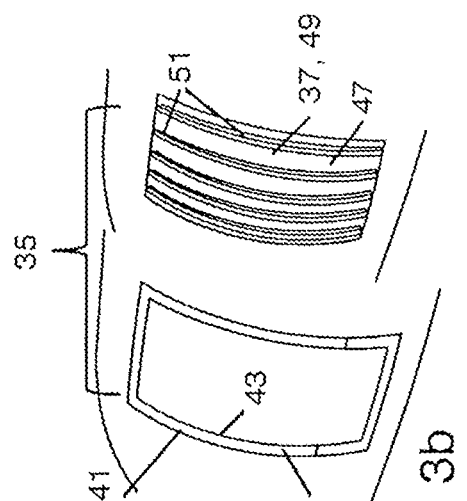
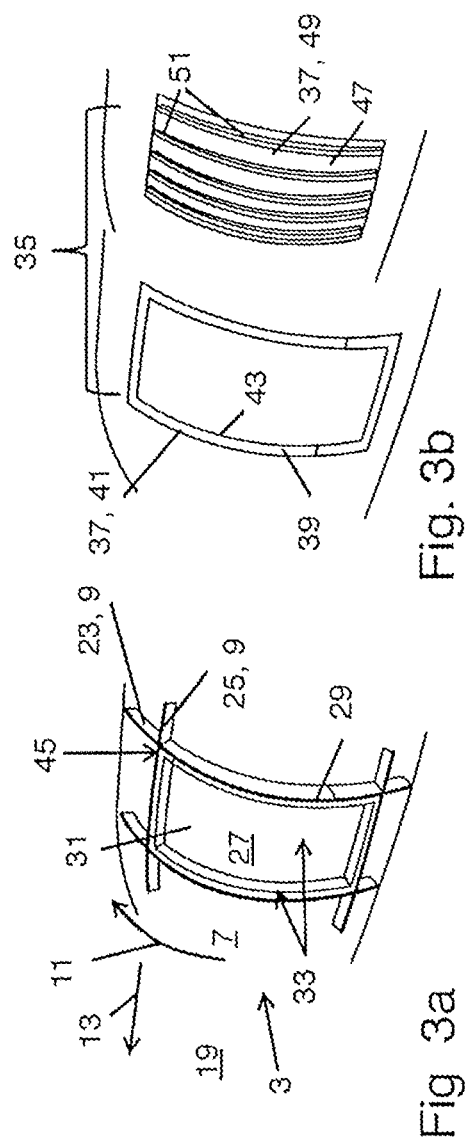

AIRCRAFT-FUSELAGE STRUCTURE WITH CONTOURED ADAPTER ARRANGEMENT FOR A DOOR

CROSS-REFERENCE TO RELATED APPLICATION

This application claims priority to German Patent Application No. 10 2019 101 783.1 filed Jan. 24, 2019, the entire disclosure of which is incorporated by reference herein.

TECHNICAL FIELD

The disclosure herein relates to an aircraft-fuselage structure. Further aspects of the disclosure herein relate to an aircraft having such an aircraft-fuselage structure, to a set of such aircraft-fuselage structures of different types of aircraft, and to a method for producing such an aircraft-fuselage structure.

BACKGROUND

The aircraft-fuselage structure comprises an external skin and a reinforcement structure. The external skin extends along a circumferential direction and a longitudinal direction, encloses are interior and has an inner side, which is directed towards the interior, and an outer side, which is directed towards the surroundings and, during flight, is in contact with an external surround flow. The reinforcement structure supports the outer skin on its inner side and comprises a multiplicity of transverse reinforcement elements, in particular ribs, and a multiplicity of longitudinal reinforcement elements, in particular stringers, which butt against the inner side of the external skin. The transverse reinforcement elements run in circumferential direction and are spaced apart from one another in the longitudinal direction, and the longitudinal reinforcement elements run in the longitudinal direction and are spaced apart from one another in a circumferential direction.

A door opening is provided in the external skin, between two adjacent transverse reinforcement elements and between two adjacent longitudinal reinforcement elements, and connects the interior to the surroundings. A door arrangement is installed in the door opening, the door arrangement having a door frame, which is fastened in the door opening, preferably on the longitudinal and transverse reinforcement elements, and a door panel, which is fastened on the door frame. The door panel can be moved, in particular pivoted or displaced, between an open position and a closed position relative to the door frame in order to provide access from the surroundings to the interior, e.g. for passengers and crew, or to close the interior.

Such aircraft-fuselage structures have been known for some time. In the case of the known aircraft-fuselage structures, the door openings are usually located in regions of the external skin which, depending on the type of aircraft and position of the door opening in the external skin, have a specific, individual spherical or cylindrical curvature. The door arrangements installed in the door openings normally likewise replicate the individual curvature of the external skin, i.e. they are curved such that their outer surface forms a seamless extension of the surrounding external skin. However, this means that each door arrangement—both within an aircraft-fuselage structure and from one type of aircraft to another—has an individual curvature and therefore has to be manufactured individually. Cost-effective manufacturing of identical parts for the door arrangements is therefore not possible.

SUMMARY

An object of the disclosure herein is therefore to provide an aircraft-fuselage structure for which the door arrangement can be manufactured as cost-effectively as possible.

This object is achieved in that the door frame and/or the door panel have/has an outer surface which is directed towards the surroundings and has a curvature which differs from the curvature of the external skin adjacent to the door opening, i.e. in particular the outer surface of the door frame and/or of the door panel does not run seamlessly with the external skin adjacent to the door opening. An adapter arrangement is fitted on the outer surface of the door frame and/or of the door panel and, on the side which is directed towards the surroundings, has at least one surface element which steadily continues the curvature of the external skin adjacent to the door opening, preferably along the entire door opening. That is to say in particular the adapter arrangement is designed such that the differences in curvature of the outer surface of the door frame and/or of the door panel in relation to the external skin adjacent to the door opening are compensated for. However, this does not rule out the possibility of minimal gaps, seams or indents at the transitions from the external skin to the surface element. The adapter arrangement here does not transmit any structural loads of the door arrangement, i.e. in particular loads which are transmitted from the external skin or the reinforcement structure to the door arrangement or loads which are introduced into the door arrangement. The structural loads acting on the door arrangement are transmitted exclusively by the door panel and the door frame. The adapter arrangement transmits merely the aerodynamic loads acting on the surface element.

This means that it is no longer necessary for the door frames and door panels to have a curvature which corresponds to the surrounding external skin, since the adapter device, in particular the surface element thereof, provides the curvature. Consequently, there is no longer any need for the door frames and door panels of an aircraft fuselage, or also of different types of aircraft, to be manufactured individually with different curvatures in each case; rather, they can be produced in the form of straightforward identical parts with a single defined curvature. There are preferably two different types of door frame and associated door panel prefabricated: one for so-called "narrow-body" aircraft with a specific first curvature and one for so-called "wide-body" aircraft with a specific second curvature.

According to a preferred embodiment, the surface element is in the form of a skin element which is retained by a supporting arrangement and is supported on the outer surface of the door frame and/or of the door panel. Such a construction is particularly economical in respect of material and weight. As an alternative, however, it is also possible for the surface element to be in the form of a continuous, smooth surface of an underlying adapter arrangement formed from solid material, for example from a foam.

According to a further preferred embodiment, the adapter arrangement is formed from a different material to the door arrangement. For example it is possible for the door arrangement to be formed from a particularly strong material, for example aluminum or CFRP, in order to absorb structural loads, whereas the adapter arrangement can be formed from a less strong, but particularly lightweight, material, for example a plastic, which is sufficient to absorb the aerodynamic loads.

According to a further preferred embodiment, the adapter arrangement has a frame adapter, which is fitted on the outer surface of the door frame and, on the side which is directed towards the surroundings, has a frame-surface element which steadily continues the curvature of the external skin adjacent to the door opening, preferably along the entire door opening. Such a frame adapter therefore adapts the curvature of the outer surface in the region of the door frame to the surrounding external skin. The frame adapter here can be provided, and fitted, independently of a panel adapter and has preferably a continuous rectangular frame running all the way round or is made up of a plurality of individual, preferably elongate or angled, frame parts.

It is particularly preferred here if the frame adapter has a crosspiece, which runs all the way round on the door frame and, on its side which is directed towards the interior, is supported on the outer surface of the door frame and on its opposite side, which is directed towards the surroundings, retains the frame-surface element, which is preferably in the form of a skin element. The crosspiece therefore supports the frame-surface element on the outer surface of the door frame and can have a gradually altering thickness or depth in order, in this way, to adapt the curvature of the frame-surface element to the curvature of the surrounding external skin.

It is also preferred if a gap is provided, for example all the way round, between the door frame and the external skin adjacent to the door opening, and wherein the frame-surface element is arranged such that it covers the gap. Such a gap can arise since the door frame manufactured in the form of an identical part of predetermined geometry, rather than being made to measure, merely fits roughly into the individual door opening of the individually curved external skin of a specific aircraft-fuselage structure. However, this gap can easily be compensated for, or covered over, with the aid of the frame adapter.

According to a further preferred embodiment, the adapter arrangement has a panel adapter, which is fitted on the outer surface of the door panel and, on the side which is directed towards the surroundings, has a panel-surface element which steadily continues the curvature of the external skin adjacent to the door opening, preferably along the entire door opening, and/or the curvature of the frame-surface element. Such a panel adapter therefore adapts the curvature of the outer surface in the region of the door panel to the surrounding external skin. The panel adapter here can be provided, and fitted, independently of a frame adapter and has preferably a more or less rectangular panel form or is made up of a plurality of individual panel parts.

It is particularly preferred here if the panel adapter has at least one supporting element, preferably a multiplicity of preferably elongate, parallel supporting elements, which, on their side which is directed towards the interior, are supported on the outer surface of the door panel and on their opposite side, which is directed towards the surroundings, retain the panel-surface element, which is preferably in the form of a skin element. The supporting elements therefore support the panel-surface element on the outer surface of the door panel and can have a gradually varying thickness or depth in order, in this way, to adapt the curvature of the panel-surface element to the curvature of the surrounding external skin.

According to a further preferred embodiment, the aircraft-fuselage structure also comprises one or more further door openings, for example, depending on the type of aircraft, 3 or 5 further door openings, in which one or more further door arrangements with one or more further door frames and one or more further door panels are installed. One or more of the further door frames here are designed with identical parts, i.e. in the form of identical parts, in relation to the door frame. In addition, or as an alternative, one or more of the further door panels are designed with identical parts in relation to the door panel. In this way, it is thus possible for a plurality of, preferably all, the door arrangements of an aircraft fuselage to be produced cost-effectively in the form of identical parts, and the corresponding curvatures of the external skin at the respective locations of the door openings are compensated for by the adapter arrangement.

A further aspect of the disclosure herein relates to an aircraft comprising the aircraft-fuselage structure according to one of the embodiments described above. The features and advantages described in conjunction with the aircraft-fuselage structure also apply analogously to the aircraft.

Yet a further aspect of the disclosure herein relates to a set of aircraft-fuselage structures of different types of aircraft, having a first aircraft-fuselage structure of a first type of aircraft and having at least a second aircraft-fuselage structure of a second type of aircraft. The first aircraft-fuselage structure here is in the form of an aircraft-fuselage structure according to one of the embodiments described above. The second aircraft-fuselage structure comprises one or more second door openings, in which one or more second door arrangements with one or more second door frames and one or more second door panels are installed. One or more of the second door frames here are designed with identical parts in relation to the door frame of the first aircraft-fuselage structure. In addition, or as an alternative, one or more of the second door panels are designed with identical parts in relation to the door panel of the first aircraft-fuselage structure. In this way, it is also possible for the door arrangements of different types of aircraft to be produced cost-effectively in the form of identical parts. The features and advantages described in conjunction with the aircraft-fuselage structure also apply analogously to the set of aircraft-fuselage structures.

Yet a further aspect of the disclosure herein relates to a method for producing an aircraft-fuselage structure according to one of the embodiments described above. First of all the door frame and/or the door panel are/is installed in the door opening. Then the adapter arrangement is fitted on the door frame and/or the door panel. Before or after this fitting operation, the adapter arrangement is adapted such that the surface element steadily continues the curvature of the external skin adjacent to the door opening. The features and advantages described in conjunction with the aircraft-fuselage structure also apply analogously to the method for producing the aircraft-fuselage structure.

BRIEF DESCRIPTION OF THE DRAWINGS

An example embodiment of the disclosure herein will be explained in more detail hereinbelow with reference to a drawing, in which:

FIG. 2a shows a door opening in an external skin of the aircraft of FIG. 1;

FIG. 2b shows a door arrangement, including a door panel and a door frame, suitable for installation within the door opening shown in FIG. 2a;

FIG. 2c shows the door arrangement of FIG. 2b installed within the door opening of FIG. 2a;

FIG. 3a shows the door arrangement of FIG. 2b installed within the door opening of FIG. 2a;

FIG. 3b shows an adapter arrangement for attachment to an outer surface of the door arrangement; and FIG. 3c shows the adapter arrangement of FIG. 3b installed over the outer surface of the door arrangement.

DETAILED DESCRIPTION

Figure 1:
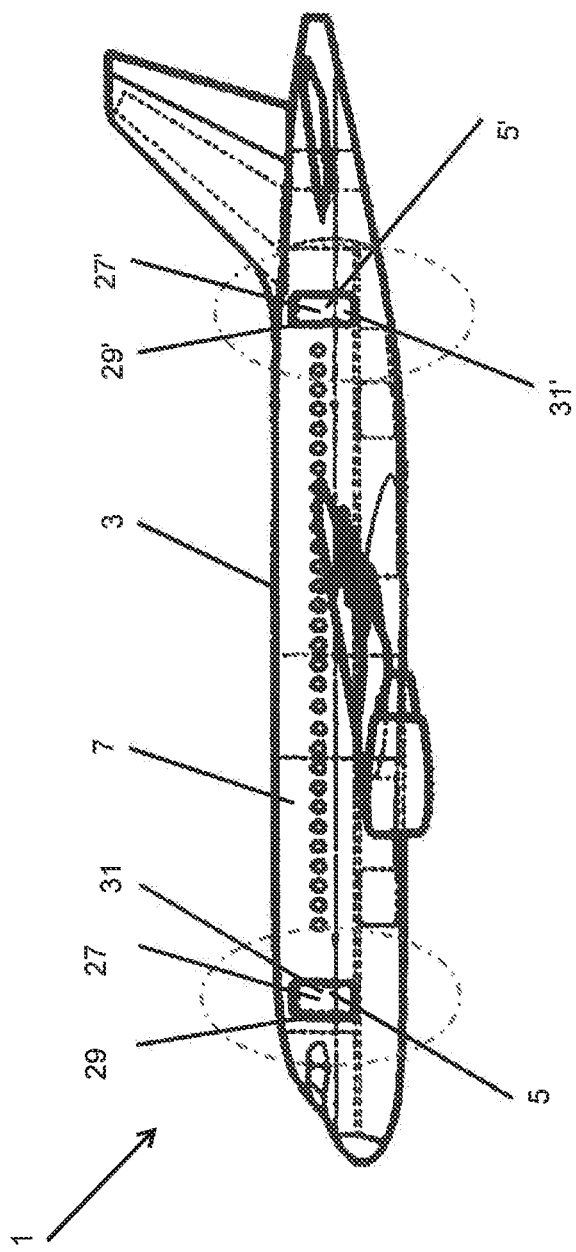
FIG. 1 shows a side view of an aircraft having a fuselage according to the disclosure herein.

FIG. 1 illustrates an aircraft 1 of a certain type. The aircraft 1 has an aircraft-fuselage structure 3 with four door openings 5—two in the front region, and two in the rear region, of the aircraft 1.

The aircraft-fuselage structure 3 comprises an external skin 7 and a reinforcement structure 9 (not shown in FIG. 1). The outer skin 7 extends along a circumferential direction 11 and a longitudinal direction 13, encloses an interior 15 and has an inner side 17, which is directed towards the interior 15, and an outer side 21, which is directed towards the surroundings 19 and, during flight, is in contact with an external surround flow. The reinforcement structure 9 supports the external skin 7 on its inner side 17 and comprises a multiplicity of transverse reinforcement elements 23 in the form of ribs and a multiplicity of longitudinal reinforcement elements 25 in the form of stringers, which butt against the inner side 17 of the external skin 7. The transverse reinforcement elements 23 run in the circumferential direction 11 and are spaced apart from one another in a longitudinal direction 13, and the longitudinal reinforcement elements 25 run in the longitudinal direction 13 and are spaced apart from one another in the circumferential direction 11.

As illustrated more specifically in FIG. 2, a door opening 5 is provided (see FIG. 2a) in the external skin 7, between two adjacent transverse reinforcement elements 23 and between two adjacent longitudinal reinforcement elements 25, and connects the interior 15 to the surroundings 19. A door arrangement 27, which is shown on its own in FIG. 2b, is installed in the door opening 5, the door arrangement having a door frame 29, which is fastened in the door opening 5, on the longitudinal and transverse reinforcement elements 25, 23, and a door panel 31, which is fastened on the door frame 29 (see FIG. 2c).

As shown in FIG. 3, the door frame 29 and the door panel 31 have an outer surface 33 which is directed towards the surroundings and has a curvature which differs from the curvature of the external skin 7 adjacent to the door opening 5 (see FIG. 3a). An adapter arrangement 35 (which is shown on its own in FIG. 3b) is fitted on the outer surface 33 of the door frame 29 and of the door panel 31 and, on the side which is directed towards the surroundings 19, has at least one surface element 37 which steadily continues the curvature of the external skin 7 adjacent to the door opening 5 (see FIG. 3c).

The adapter arrangement 35 has a frame adapter 39 (see FIG. 3b), which is fitted on the outer surface 33 of the door frame 29 and, on the side which is directed towards the surroundings 19, has a frame-surface element 41, which is in the form of a skin element and steadily continues the curvature of the external skin 7 adjacent to the door opening 5. The frame adapter 39 has a crosspiece 43, which runs all the way round along the door frame 29 and, on its side which is directed towards the interior 15, is supported on the outer surface 33 of the door frame 29 and on its opposite side, which is directed towards the surroundings 19, retains the frame-surface element surface 41. A gap 45 is present, all the way round, between the door frame 29 and the external skin 7 adjacent to the door opening 5, and the frame-surface element 41 is arranged such that it covers the gap 45.

The adapter arrangement 35 also has a panel adapter 47 (see FIG. 3b), which is fitted on the outer surface 33 of the door panel 31 and, on the side which is directed towards the surroundings 19, has a panel-surface element 49, which is in the form of a skin element and steadily continues the curvature of the external skin 7 adjacent to the door opening 5 and the curvature of the frame-surface element 41. The panel adapter 47 has a multiplicity of elongate, parallel supporting elements 51, which, on their side which is directed towards the interior 15, are supported on the outer surface 33 of the door panel 31 and on their opposite side, which is directed towards the surroundings 19, retain the panel-surface element 49.

Only one door opening 5 or door arrangement 27 is illustrated in FIGS. 2 and 3. As can be seen in FIG. 1, provision is also made, in addition, for three further door openings 5' in the aircraft-fuselage structure 3, a further door arrangement 27' with a further door frame 29' and a further door panel 31' being installed in each of the three further door openings. The further door frames 29' and further door panels 31' of the further door arrangements 27' here are designed with identical parts in relation to the door frames 29 and door panels 31 of the door arrangement 27 shown in FIGS. 2 and 3, and corresponding adapter arrangements 35, as described above, adapt the curvature of the associated surface elements 37 to the curvature of the external skin 7 surrounding the respective door opening 5.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft-fuselage structure comprising:
   an external skin which extends along a circumferential direction and a longitudinal direction, encloses an interior and has an inner side, which is directed towards the interior, and an outer side, which is directed towards surroundings;
   a reinforcement structure, which supports the external skin on the inner side and comprises a multiplicity of transverse reinforcement elements and longitudinal reinforcement elements, wherein the transverse reinforcement elements run in the circumferential direction and are spaced apart from one another in the longitudinal direction, and wherein the longitudinal reinforcement elements run in the longitudinal direction and are spaced apart from one another in the circumferential direction;
   a door opening formed in the external skin, between two transverse reinforcement elements and between two longitudinal reinforcement elements, respectively, of the multiplicity of transverse reinforcement elements and longitudinal reinforcement elements, wherein the door opening connects the interior to the surroundings; and a door arrangement in the door opening, wherein the door arrangement has a door frame, which is fastened in the door opening, and a door panel, which is fastened on the door frame and is movable between an open position and a closed position, relative to the door frame, wherein the door frame and the door panel have an outer surface, which is directed towards the surroundings, and a curvature, which differs from a curvature of the external skin adjacent to the door opening; and an adapter arrangement fitted on the outer surface of the door frame and of the door panel and has, on a side which is directed towards the surroundings, surface elements, which steadily continues the curvature of the external skin adjacent to the door opening.

2. The aircraft-fuselage structure according to claim 1, wherein one of the surface elements is in a form of a skin element which is supported on the outer surface of the door frame and of the door panel.

3. The aircraft-fuselage structure according to claim 1, wherein the adapter arrangement is formed from a different material to the door arrangement.

4. The aircraft-fuselage structure according to claim 1, wherein:
one of the surface elements comprises a frame-surface element; and
the adapter arrangement has a frame adapter, which is fitted on the outer surface of the door frame and, on the side which is directed towards the surroundings, has the frame-surface element which steadily continues the curvature of the external skin adjacent to the door opening.

5. The aircraft-fuselage structure according to claim 4, wherein the frame adapter has a crosspiece, which runs completely around along the door frame.

6. The aircraft-fuselage structure according to claim 4, wherein a gap is between the door frame and the external skin adjacent to the door opening, and wherein the frame-surface element is arranged such that it covers the gap.

7. The aircraft-fuselage structure according to claim 4, wherein:
another of the surface elements comprises a panel-surface element; and
the adapter arrangement has a panel adapter, which is fitted on the outer surface of the door panel and has, on the side which is directed towards the surroundings, the panel-surface element which steadily continues the curvature of the external skin adjacent to the door opening and/or of the frame-surface element.

8. The aircraft-fuselage structure according to claim 7, wherein the panel adapter has a multiplicity of supporting elements, which, on their side which is directed towards the interior, are supported on the outer surface of the door panel and on their opposite side, which is directed towards the surroundings, retain the panel-surface element.

9. The aircraft-fuselage structure according to claim 1, comprising one or more further door openings, in which one or more further door arrangements with one or more further door frames and one or more further door panels are installed, wherein one or more of the further door frames are designed with identical parts in relation to the door frame, and/or wherein one or more of the further door panels comprise identical parts in relation to the door panel.

10. An aircraft comprising the aircraft-fuselage structure according to claim 1.

11. A set of aircraft-fuselage structures, the set comprising:
a first aircraft-fuselage structure of a first type of aircraft, which is in a form of an aircraft-fuselage structure according to claim 1; and
a second aircraft-fuselage structure of a second type of aircraft, which comprises one or more second door openings, in which one or more second door arrangements with one or more second door frames and one or more second door panels are installed, wherein:
one or more of the second door frames comprise identical parts in relation to the door frame of the first aircraft-fuselage structure; and/or
one or more of the second door panels comprise identical parts in relation to the door panel of the first aircraft-fuselage structure.

12. A method for producing an aircraft-fuselage structure, the aircraft-fuselage structure comprising:
an external skin which extends along a circumferential direction and a longitudinal direction, encloses an interior and has an inner side, which is directed towards the interior, and an outer side, which is directed towards surroundings;
a reinforcement structure, which supports the external skin on the inner side and comprises a multiplicity of transverse reinforcement elements and longitudinal reinforcement elements, wherein the transverse reinforcement elements run in the circumferential direction and are spaced apart from one another in the longitudinal direction, and wherein the longitudinal reinforcement elements run in the longitudinal direction and are spaced apart from one another in the circumferential direction;
a door opening formed in the external skin, between two transverse reinforcement elements and between two longitudinal reinforcement elements, respectively, of the multiplicity of transverse reinforcement elements and longitudinal reinforcement elements, wherein the door opening connects the interior to the surroundings; and
a door arrangement in the door opening, wherein the door arrangement has a door frame, which is fastened in the door opening, and a door panel, which is fastened on the door frame and is movable between an open position and a closed position, relative to the door frame, wherein the door frame and the door panel have an outer surface, which is directed towards the surroundings, and a curvature, which differs from a curvature of the external skin adjacent to the door opening; and
an adapter arrangement fitted on the outer surface of the door frame and of the door panel and has, on a side which is directed towards the surroundings, surface elements, which steadily continues the curvature of the external skin adjacent to the door opening;
the method comprising:
in a first step, installing the door frame and the door panel in the door opening; and
in a second step, fitting the adapter arrangement on the door frame and the door panel.

* * * * *